United States Patent Office

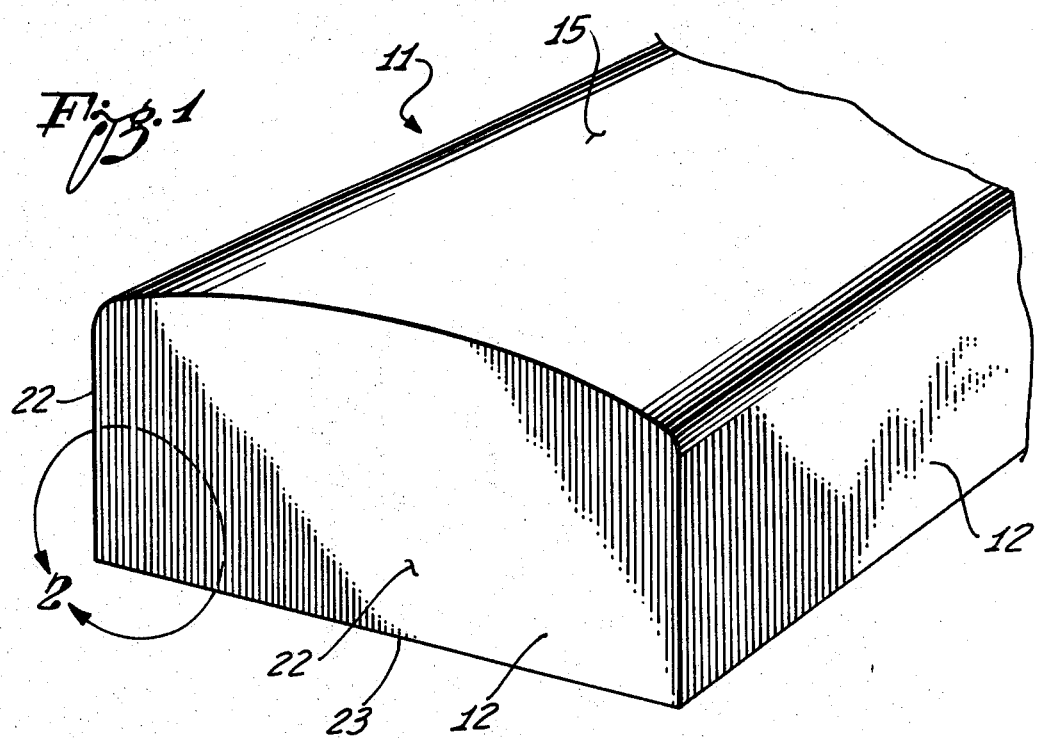
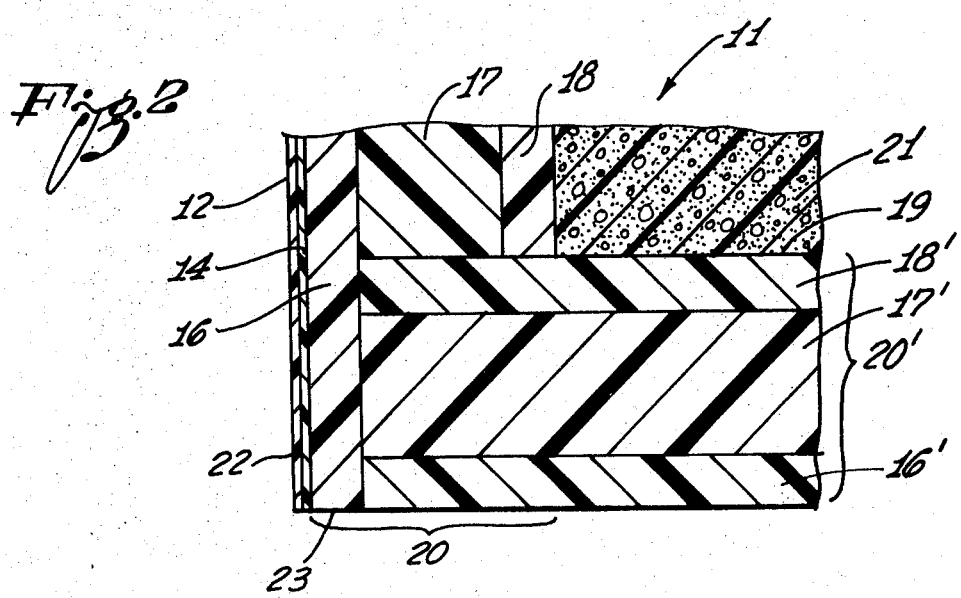

3,558,409
Patented Jan. 26, 1971

3,558,409
LAMINATED STRETCH FORM DIE
Antone M. Guerreiro, Hawthorne, Calif., assignor to Northrop Corporation, Beverly Hills, Calif., a corporation of California
Filed Mar. 13, 1967, Ser. No. 622,631
Int. Cl. B32b 1/04
U.S. Cl. 161—44          2 Claims

ABSTRACT OF THE DISCLOSURE

An article of manufacture constructed of synthetic resins designed to replace "kirksite" dies and dies constructed of similar materials utilized extensively in stretch forming operations. The article may be constructed as a dry-lubricant filled plastic shell or skin, the inner surface of which is successively coated with a plurality of layers of resin mix containing a reinforcing agent. The remaining internal portion or cavity of the article is filled with a rigid foam system. The article is completed by applying coats of resin mix—as described above—to the lower portion of the article thereby enclosing the foam system and sealing the article. The method of constructing the article is also disclosed herein.

---

A principal object of the present invention is to disclose rigid bodies constructed for the most part of resin mixes, also the method of making the same, adapted to withstand high compressive loads.

The above and other characteristic features are particularly pointed out in the appended claims, the invention itself, also the manner in which it may be carried out, will be better understood by referring to the following description taken in connection with the accompanying drawings forming a part of this application and in which:

FIG. 1 is a perspective view of a rigid body as disclosed herein.

FIG. 2 is a detail view of construction of the rigid body of FIG. 1 as indicated by the area enclosed in circle 2 of the latter figure.

The article 11 as described herein constitutes a body consisting generally of resin materials usable in effecting stretch forming operations designed to replace metal dies, hand laminated plastic tools etc. Generally the article 11 includes a wall or outer surface 12, a plurality of layers of resin mixes 14, 16—16', 17—17', 18—18' and a body constituting a resin foam system 21.

The wall 12 defines a shell-like structure including an upper and side surfaces 15 and 22, respectively, and lower edges 23. The wall 12 is approximately one sixteenth inch (1/16") thick, constructed of a material having good wear resistant and lubricious qualities. The upper surface 15—as finished—constitutes a contoured surface having the same configuration as that of a plate or sheet to be formed thereon. Suitable material from which the wall 12 may be fabricated is of a material marketed under the trade name "Teflon," however, other materials having the above or similar qualities may be employed.

The layers 14, 16, 17 and 18 hereafter referred to as first, second, third and fourth layers constitute distinct layers, the fourth layer defining a cavity 19 containing the aforementioned foam system 21 which in turn is sealed by layers 18', 17' and 16' as shown in FIG. 2. The layers 18', 17' and 16', hereafter referred to as fifth, sixth and seventh layers also constitute distinct layers.

The first layer—layer 14—located immediately adjacent the inner surface of the wall 12 extends flush with the edges 23 as shown in FIG. 2. The layer 14 constitutes a layer of reinforced epoxy resin approximately one sixteenth of an inch (1/16") thick. The reinforcing means constitutes glass fibers, evenly distributed throughout the epoxy resin varying in length between three eighths and three quarters of an inch (3/8"–3/4"). If substantially longer or shorter filaments are used the resin mix will have a tendency to separate from the side walls of the structure 12.

The second or next layer—layer 16—also constitutes a layer of reinforced epoxy resin approximately three eighths of an inch (3/8") thick. In this layer the reinforcing means also constitutes glass fibers varying in length between one and two (1"–2") inches. The layer 16 also has a flush relation with the edges 23 as shown in FIG. 2.

The third or next succeeding layer—layer 17—constitutes a syntactic foam type of epoxy (microballoon filled epoxy resin) generally one inch (1") in thickness but considerably thicker at the edges and corners of the article 11. This layer constitutes a commercial product and is marketed under the trade name of "Tufstuff" and other trade names. The material comprising the layer 17 (considered per se) is extremely tough and when considered with other components of the article 11—as presently explained—greatly increases the toughness and load carrying capacities of the article 11. It will be noted (FIG. 2) that the layer 17 terminates short of the edges 23 providing sufficient space to add layers 18', 17' and 16'.

The fourth or next succeeding layer—layer 18—constitutes a layer of reinforced epoxy resin constructed the same as the second layer—layer 16—viz., epoxy resin having one to two inch (1"–2") glass fibers evenly distributed therein. It will be noted that this layer also terminates short of the edges 23 for the same reason that layer 17 terminates short of the edges 23.

The layers 16, 17 and 18 are collectively referred to as a sandwich structure 20. These layers coact with each other and with the rigid foam system—presently described—to enhance the load carrying abilities of the article 11.

From the description of the article 11 given thus far it will be apparent that the cavity 19 is defined by the inner surface of the layer 18. This cavity is filled with the aforementioned foam system 21 to within approximately one and three quarters inches (1¾") of the edges 23. The article 11 is completed by adding layers 18', 17' and 16' below the foam system 21 (FIG. 2), the layers 18', 17' and 16' considered in their entirety, constitute a sandwich structure. The layers 18', 17' and 16' are constructed of the same material and are of the same thickness as the layers 18, 17 and 16, respectively. It will now be apparent that the lower layer 16' functions as a base for the article 11. It will also be apparent that the foam system 21 is completely enclosed (sealed) by the layers 16—16', 17—17' and 18—18'. Thus the sandwich structure 20 is provided with good back-up material (foam system 21), which, in addition to being a rigid system, is confined and, therefore, provide high load carrying capabilities.

Regarding the method of making the article 11, a mold is first prepared having the same inside configuration (length, breadth and depth) as the article 11. However, the generally horizontal surface (corresponding to the surface 15 of the article 11) constitutes a surface contoured to mate with the surface 15 of the article 11. In other words, the inside surface of the mold constitutes a concave surface while the surface 15 constitutes a convex surface. The mold—just referred to—is normally constructed of plaster, however, other materials may be used for this purpose. The thickness of the mold is not important and may be of any thickness desired.

Further preparation of the mold and associated components constitutes, applying a release agent to the convex and side surfaces of the mold. Treating the mold in this manner allows the lubricious material 12 to be freed from the mold. The layer 12 may be brushed or sprayed on the inner surfaces of the mold until it is of the thickness previously mentioned. The lubricious material is allowed to cure or dry, thus the structure 12 is provided.

The layer 14 of reinforced epoxy resin is applied next. This layer, as well as succeeding layers, constitutes the resin mixes as previously described. Inasmuch as layers 14, 16—16', 17—17' and 18—18' are of considerable thickness they may be applied with a liquid gun and accordingly are referred to as "spray-ups." Accordingly the layers 16, 17 and 18 are applied as "spray-ups," coats or layers after the "spray-up" (layer 14) has been applied.

After the "spray-ups" 16, 17 and 18 have been applied they are rolled to render the laminate structure (sandwich 20) as free of entrapped air as possible. It will be noted that the "spray-ups" 14 and 16 extend to the edges 23 while the layers 17 and 18 terminate short of the edges 23 by approximately one and three quarters of an inch (1¾").

The sandwich structure is now provided with back-up material 21 constituting a foamed in place rigid foam system filling the cavity 19 to a plane approximately one and three quarters inches (1¾") from the edges 23. After the exotherm of the foam system 21 has subsided the spray-ups 18', 17' and 16' are added as shown in FIG. 2. The spray-ups 18', 17' and 16' correspond to the construction of the spray-ups 18, 17 and 16, respectively.

As soon as the spray-ups 18' 17' and 16' are cured—or at least partially cured—the spray-up 16' is trued thereby rendering the lower surface of the article 11 ninety degrees with respect to the sides 22 to provide a true base for the article 11.

It will thus be seen the construction of the article 11 is completed. The foam system 21 is completely enclosed by a plurality of distinct spray-ups or layers 16, 17, 18 and 18', 17', 16' (sandwich structures 20 and 20') cooperating to enable the article 11 to withstand high compressive loads.

While in order to comply with the statute, the invention has been described in language more or less specific as to structural features, it is to be understood that the invention is not limited to the specific features shown.

I claim:
1. A rigid body constructed generally of resinous material adapted to withstand high compressive loads, comprising:
 (a) a shell-like structure approximately one sixteenth inch thick constructed of Teflon material including upper and side surfaces, the latter terminating in a common reference plane;
 (b) a first distinct layer of epoxy resin, containing fiber glass filaments of a length between three eighths and three quarters of an inch, approximately one sixteenth of an inch thick positioned immediately adjacent and in contacting relation with said shell-like structure;
 (c) a second distinct layer of epoxy resin, containing fiber glass filaments between one and two inches in length, approximately three eighths of an inch thick, positioned immediately adjacent and in contacting relation with said first layer;
 (d) the edge portions of said first and second layers terminating in said common reference plane;
 (e) a third distinct layer of epoxy resin approximately one inch thick positioned immediately adjacent and in contacting relation with said second layer;
 (f) a fourth distinct layer of epoxy resin, containing fiber glass filaments between one and two inches in length, approximately three eighths of an inch thick, positioned immediately adjacent and in contacting relation with said third layer, the inner surface of said fourth layer defining a cavity;
 (g) the edge portions of said third and fourth layers terminating short of said common reference plane;
 (h) said cavity filled with a foam system short of said common reference plane;
 (i) fifth, sixth and seventh distinct layers of the same thickness and of the same construction as the second, third and fourth layers, respectively, positioned in the remaining space between the edge portions of the third and fourth layers and foam system and said common referenced plane;
 (j) and said second, third and fourth layers, on the one hand, and said fifth, sixth and seventh layers, on the other, constituting first and second sandwich structure, respectively, completely surrounding said foam system and functioning to transmit and distribute concentrated loads acting on the outer surface of said shell-like structure to said foam system over a wide area.

2. Structure as set forth in claim 1:
 (a) in which the surfaces of the layers, constituting the second sandwich structure, having a normal relation with respect to the side surfaces of the layers, constituting the first sandwich structure.

References Cited

UNITED STATES PATENTS

| | | | |
|---|---|---|---|
| 2,724,868 | 11/1955 | Kish | 264—45 |
| 2,836,530 | 5/1958 | Rees | 156—245X |
| 3,035,310 | 5/1962 | Sokol et al. | 156—245X |
| 3,088,174 | 5/1963 | Kolt | 264—255X |
| 3,239,590 | 3/1966 | Trimble | 156—245X |
| 3,293,203 | 12/1966 | Paulus | 260—836X |

OTHER REFERENCES

Tooling for Aircraft and Missile Manufacture, A.S.T.M.E., 1964, pp. 262–263.
Plastics Tooling and Manufacturing Handbook, A.S.T.M.E., 1965, pp. 71–76.
Plastics Tooling, Riley, Malcolm, 1961, p. 119.

HAROLD ANSHER, Primary Examiner

J. C. GIL, Assistant Examiner

U.S. Cl. X.R.

72—476; 76—4; 156—245; 161—189; 264—45, 255, 308